US012700695B2

(12) United States Patent
Nishitani

(10) Patent No.: US 12,700,695 B2
(45) Date of Patent: Aug. 4, 2026

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Akihiro Nishitani, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 333 days.

(21) Appl. No.: 18/570,573

(22) PCT Filed: May 31, 2022

(86) PCT No.: PCT/JP2022/022027
§ 371 (c)(1),
(2) Date: Dec. 14, 2023

(87) PCT Pub. No.: WO2022/264798
PCT Pub. Date: Dec. 22, 2022

(65) Prior Publication Data

US 2024/0283190 A1 Aug. 22, 2024

(30) Foreign Application Priority Data

Jun. 18, 2021 (JP) ................................ 2021-101382

(51) Int. Cl.
*H01R 13/514* (2006.01)
*H01R 13/506* (2006.01)

(52) U.S. Cl.
CPC ......... *H01R 13/514* (2013.01); *H01R 13/506* (2013.01)

(58) Field of Classification Search
CPC ............................ H01R 13/515; H01R 13/506
(Continued)

(56) References Cited

U.S. PATENT DOCUMENTS 5,122,077 A * 6/1992 Maejima .............. H01R 13/514 439/701
6,068,522 A * 5/2000 Aoyama .............. H01R 13/506 439/701
(Continued)

FOREIGN PATENT DOCUMENTS

JP 2007-026764 A 2/2007

OTHER PUBLICATIONS

International Search Report issued on Aug. 23, 2022 for WO 2022/264798 A1 (5 pages).

*Primary Examiner* — Gary F Paumen
(74) *Attorney, Agent, or Firm* — Venjuris, P.C.

(57) ABSTRACT

Separation of housings in a stacked state can be suppressed. A connector (1) is provided with housings (10, 20, 30) to be stacked on each other, terminal fittings (50) to be accommodated into the respective housings (10, 20, 30), wires (60) fixed to the terminal fittings (50) and drawn out rearward, and a rear wall portion (40). The rear wall portion (40) includes a through hole (42) for allowing passage of the wires (60) and is molded as a single part. The rear wall portion (40) is formed with first separation restricting portions (43) and second separation restricting portions (44) for restricting separation of the wires (60) arranged in a stacking direction of the respective housings (10, 20, 30) from the other wires (60) in an opposite direction along the stacking direction.

8 Claims, 11 Drawing Sheets

(58) Field of Classification Search
USPC .......................................................... 439/701
See application file for complete search history.

(56) References Cited

U.S. PATENT DOCUMENTS

| | | | | |
|---|---|---|---|---|
| 6,174,201 | B1 * | 1/2001 | Murakami | H01R 13/5208 439/275 |
| 7,004,796 | B2 * | 2/2006 | Fukuda | H01R 43/048 439/752 |
| 2002/0177371 | A1 * | 11/2002 | Fukuda | H01R 4/2454 439/701 |
| 2004/0033731 | A1 * | 2/2004 | Oda | H01R 13/518 439/709 |
| 2004/0242068 | A1 | 12/2004 | Fukuda et al. | |
| 2020/0136295 | A1 | 4/2020 | Tsukiyoshi et al. | |

* cited by examiner

CONNECTOR

CROSS REFERENCE TO RELATED APPLICATIONS

This application is a national phase of PCT application No. PCT/JP2022/022027, filed on 31 May 2022, which claims priority from Japanese patent application No. 2021-101382, filed on 18 Jun. 2021, all of which are incorporated herein by reference.

TECHNICAL FIELD

The present disclosure relates to a connector.

BACKGROUND

A stacking connector of Patent Document 1 is provided with a first housing and a second housing to be stacked on each other. Terminal fittings fixed to wires are inserted into the respective housings from behind.

PRIOR ART DOCUMENT

Patent Document

Patent Document 1: JP 2020-068098 A

SUMMARY OF THE INVENTION

Problems to be Solved

In the stacking connector of Patent Document 1, if the wire projecting from the first housing (lower housing) is pulled downward and the wire projecting from the second housing (upper housing) is pulled upward, locking between the housings is released and the housings in a stacked state are separated.

The present disclosure was completed on the basis of the above situation and aims to suppress the separation of housings in a stacked state.

Means to Solve the Problem

The present disclosure is directed to a connector with a plurality of housings to be stacked on each other, terminal fittings to be accommodated into the housings, wires fixed to the terminal fittings, the wires being drawn out rearward from the housing, and a rear wall portion including a through hole for allowing passage of the wires, the rear wall portion being molded as a single component or single part, the rear wall portion being formed with a separation restricting portion for restricting separation of the wires arranged in a stacking direction of the housings from the other wires in an opposite direction along the stacking direction.

Effect of the Invention

According to the present disclosure, the separation of housings in a stacked state can be suppressed.

DETAILED DESCRIPTION TO EXECUTE THE INVENTION

Description of Embodiments of Present Disclosure

Figure 1:
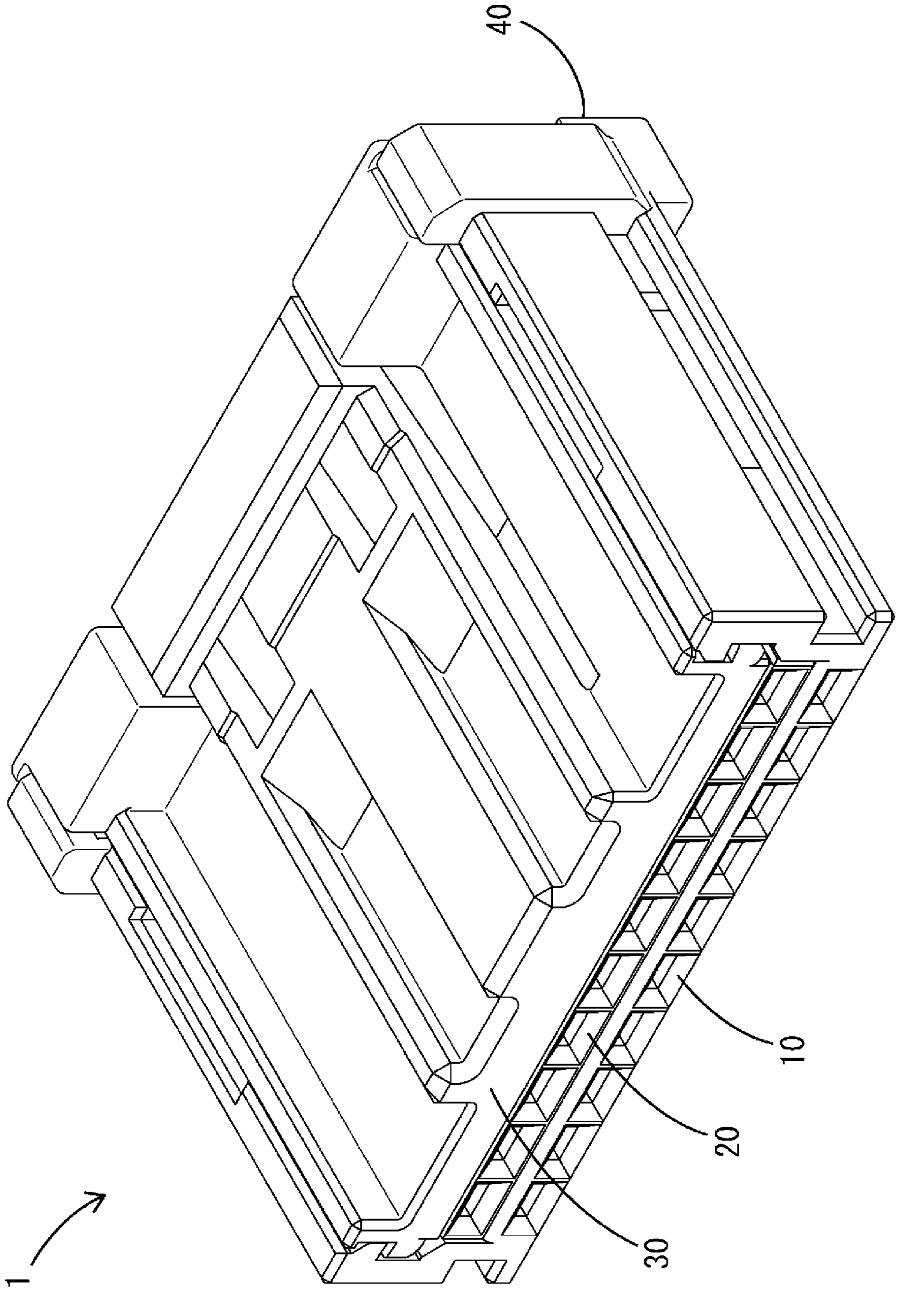
FIG. 1 is a perspective view of a connector in one embodiment when viewed from front.

First, embodiments of the present disclosure are listed and described.

(1) The connector of the present disclosure is provided with a plurality of housings to be stacked on each other, terminal fittings to be accommodated into the housings, wires fixed to the terminal fittings, the wires being drawn out rearward from the housing, and a rear wall portion including a through hole for allowing passage of the wires, the rear wall portion being molded as a single component or single part, the rear wall portion being formed with a separation restricting portion for restricting separation of the wires arranged in a stacking direction of the housings from the other wires in an opposite direction along the stacking direction.

According to the configuration of the present disclosure, since the separation restricting portion is formed in the rear wall portion molded as the single component or single part, even if the wire is pulled in a separation direction (direction opposite to the other wires), a pulling force applied to the wire can be received by the rear wall portion. Thus, the pulling force applied to the wire is less likely to be exerted to the housings and the separation of the housings in a stacked state can be suppressed.

(2) Preferably, the housing includes a plurality of terminal accommodation chambers arranged in a direction intersecting the stacking direction, the terminal fittings are accommodated into the terminal accommodation chambers, and the through hole is partitioned to individually communicate with the plurality of terminal accommodation chambers.

According to this configuration, since the through hole is configured to individually communicate with the plurality of terminal accommodation chambers, the terminal fitting is easily inserted into the terminal accommodation chamber when the wire is passed through the through hole. Erroneous insertion of the terminal fitting into the terminal accommodation chamber can also be prevented.

(3) Preferably, the rear wall portion is integrally formed to one of the housings. According to this configuration, the number of members can be reduced as compared to the case where the rear wall portion is a component separate from the housing.

(4) Preferably, the rear wall portion is located behind the housing not formed with the rear wall portion.

According to this configuration, since a rearward displacement of the housing not formed with the rear wall portion can be prevented, it is not necessary to provide a lock for restricting a rearward displacement.

(5) Preferably, the housing includes a plurality of terminal accommodation chambers arranged in a direction intersecting the stacking direction, and a tapered guiding portion is formed on a rear end opening edge part of the terminal accommodation chamber of the housing not formed with the rear wall portion.

According to this configuration, since the terminal fitting is guided forward by the tapered guiding portion immediately after passing through the through hole of the rear wall portion, the terminal fitting can be prevented from being caught by the rear end opening edge of the terminal accommodation chamber.

(6) Preferably, the plurality of housings include locking portions for holding the plurality of housings in a stacked state, and the locking portions are formed only on both end parts of the housings in a width direction intersecting a draw-out direction of the wires.

According to this configuration, the structures of the housings can be simplified by providing the locking portions only on the both end parts of the housings.

Details of Embodiment of Present Disclosure

Embodiment

Figure 6:
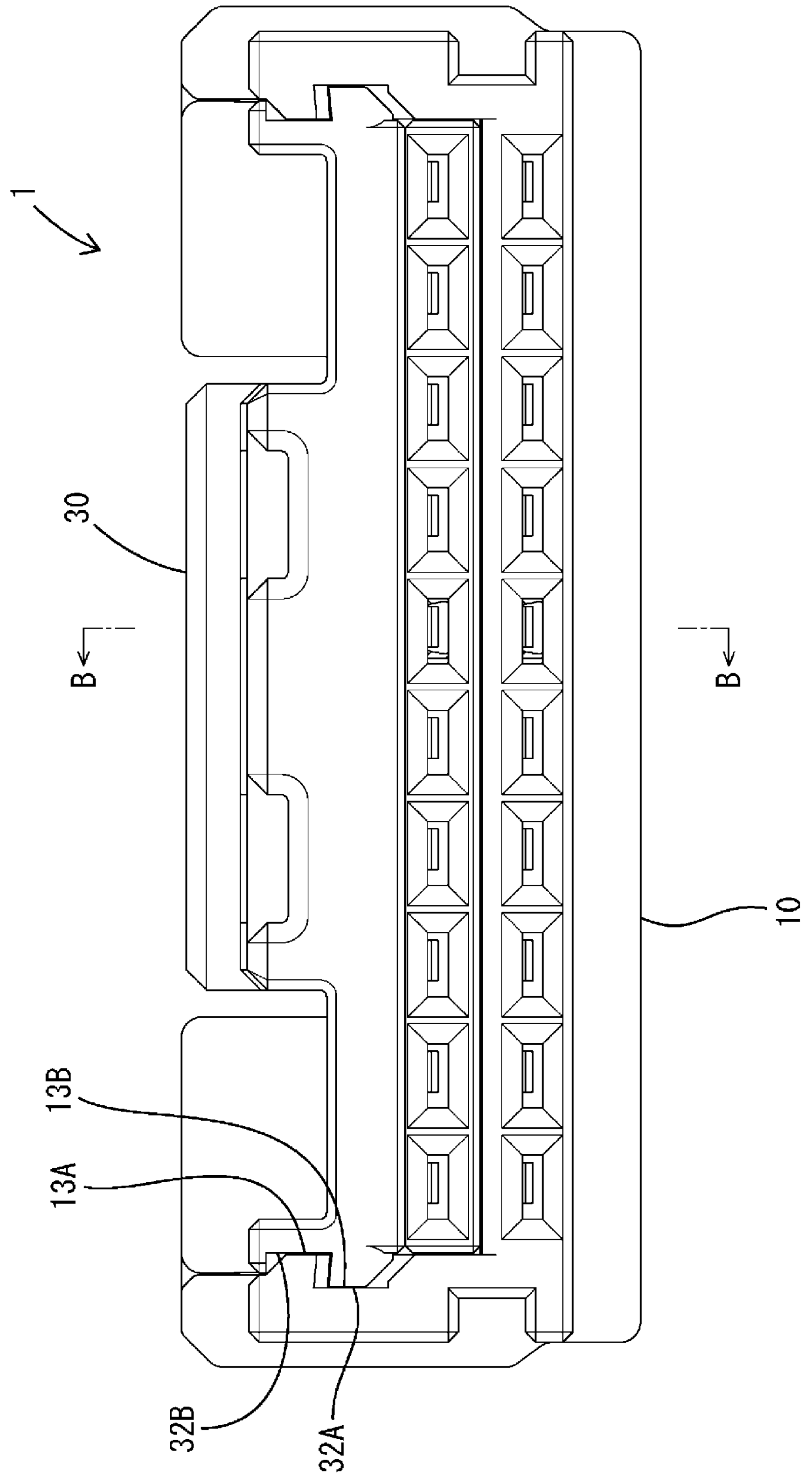
FIG. 6 is a front view of the connector.
Figure 7:
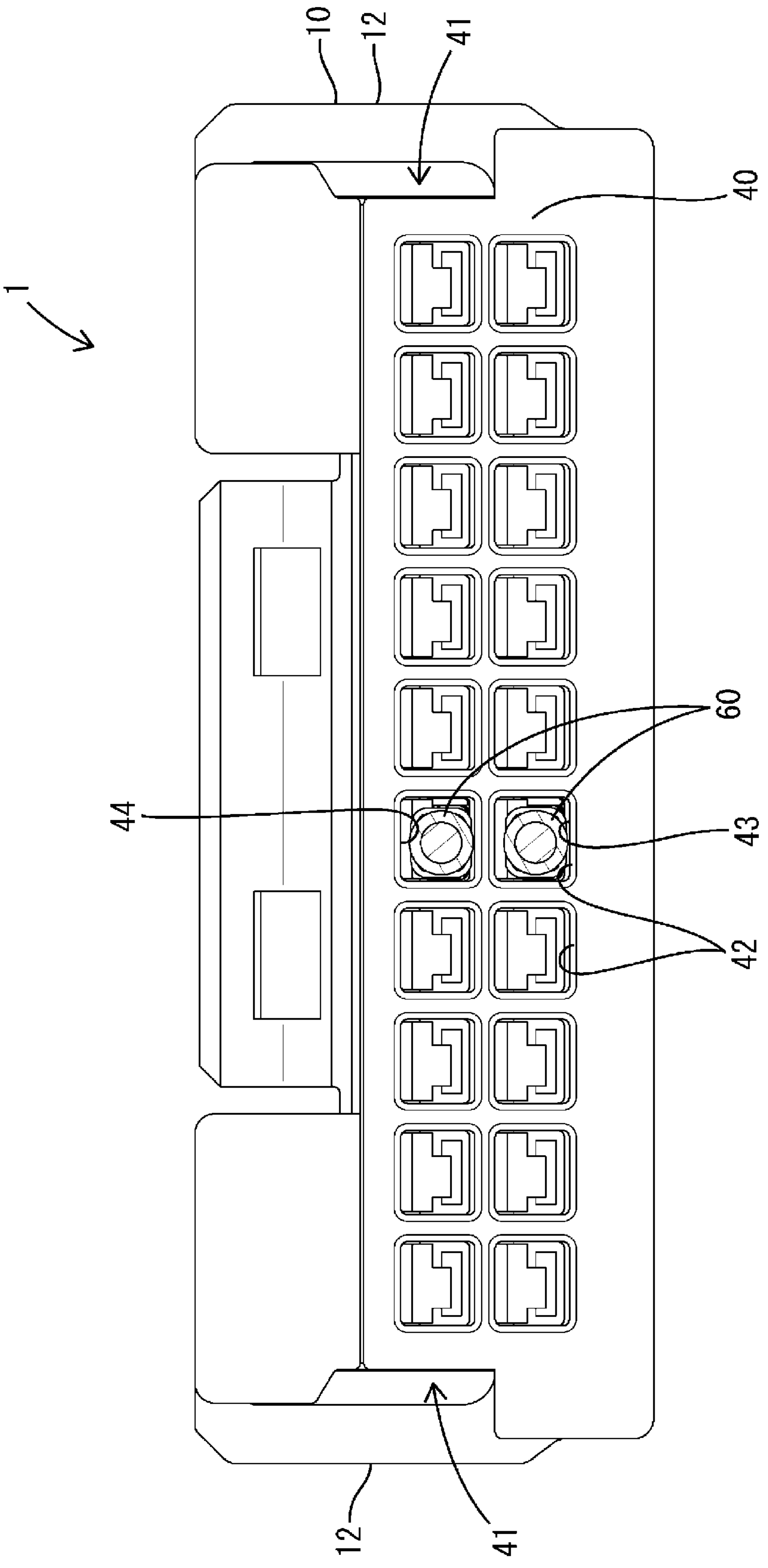
FIG. 7 is a back view of the connector.
Figure 8:
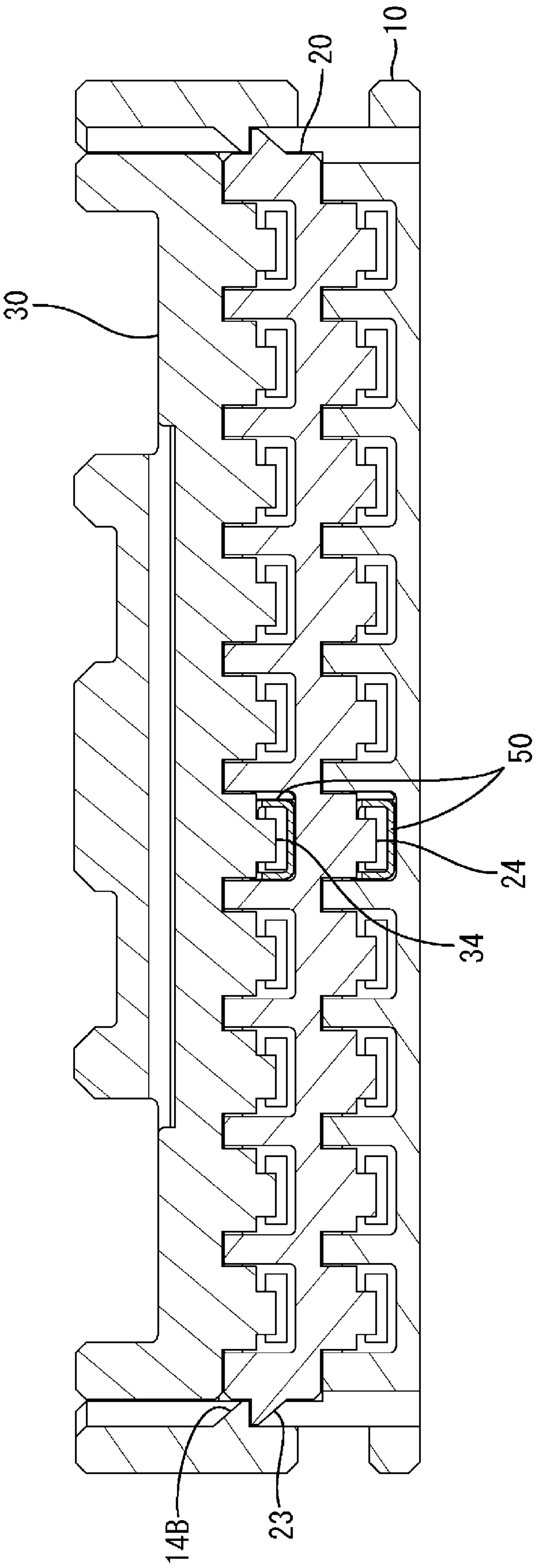
FIG. 8 is a section along A-A of FIG. 9.
Figure 9:
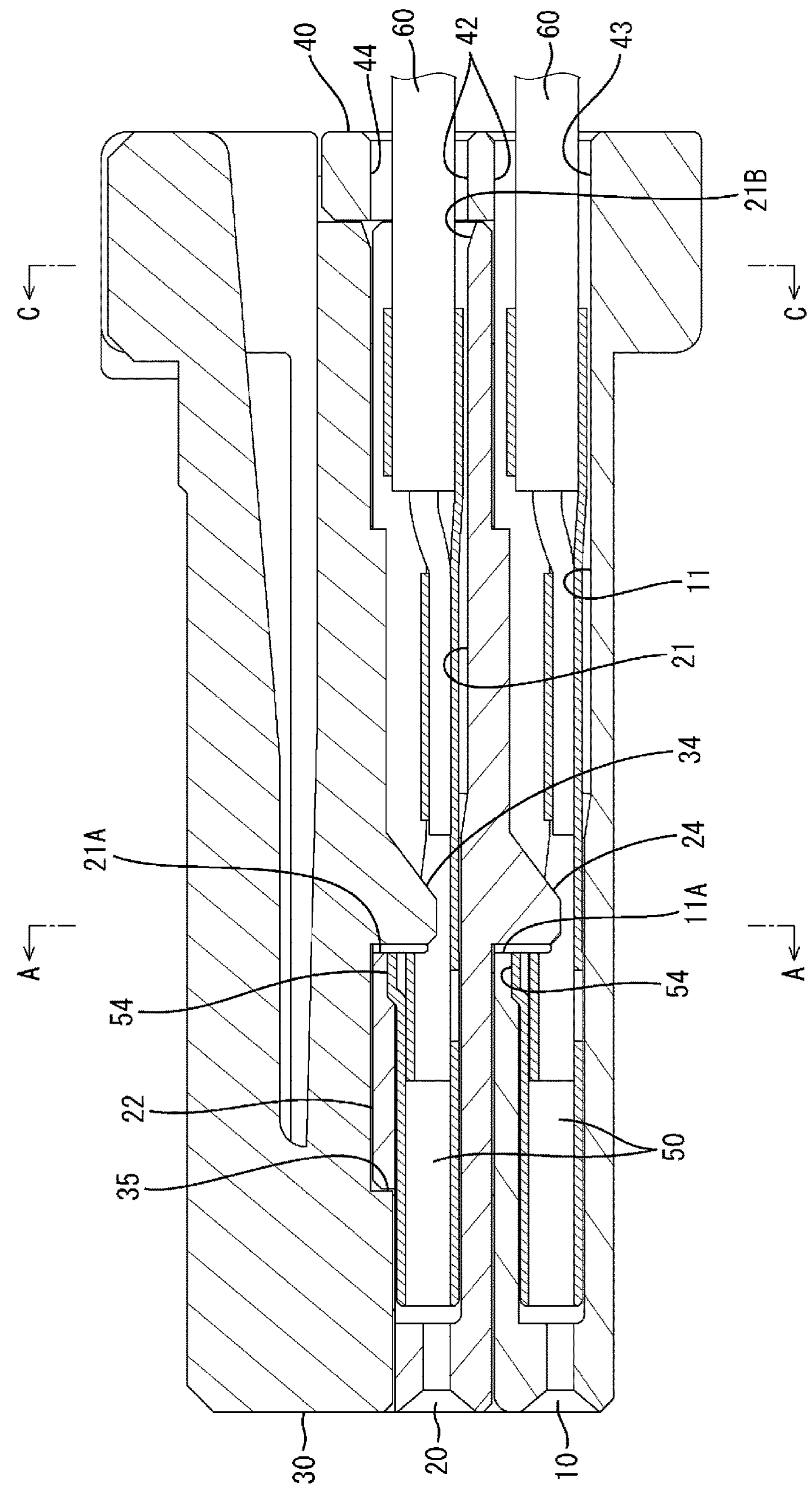
FIG. 9 is a section along B-B of FIG. 6.
Figure 10:
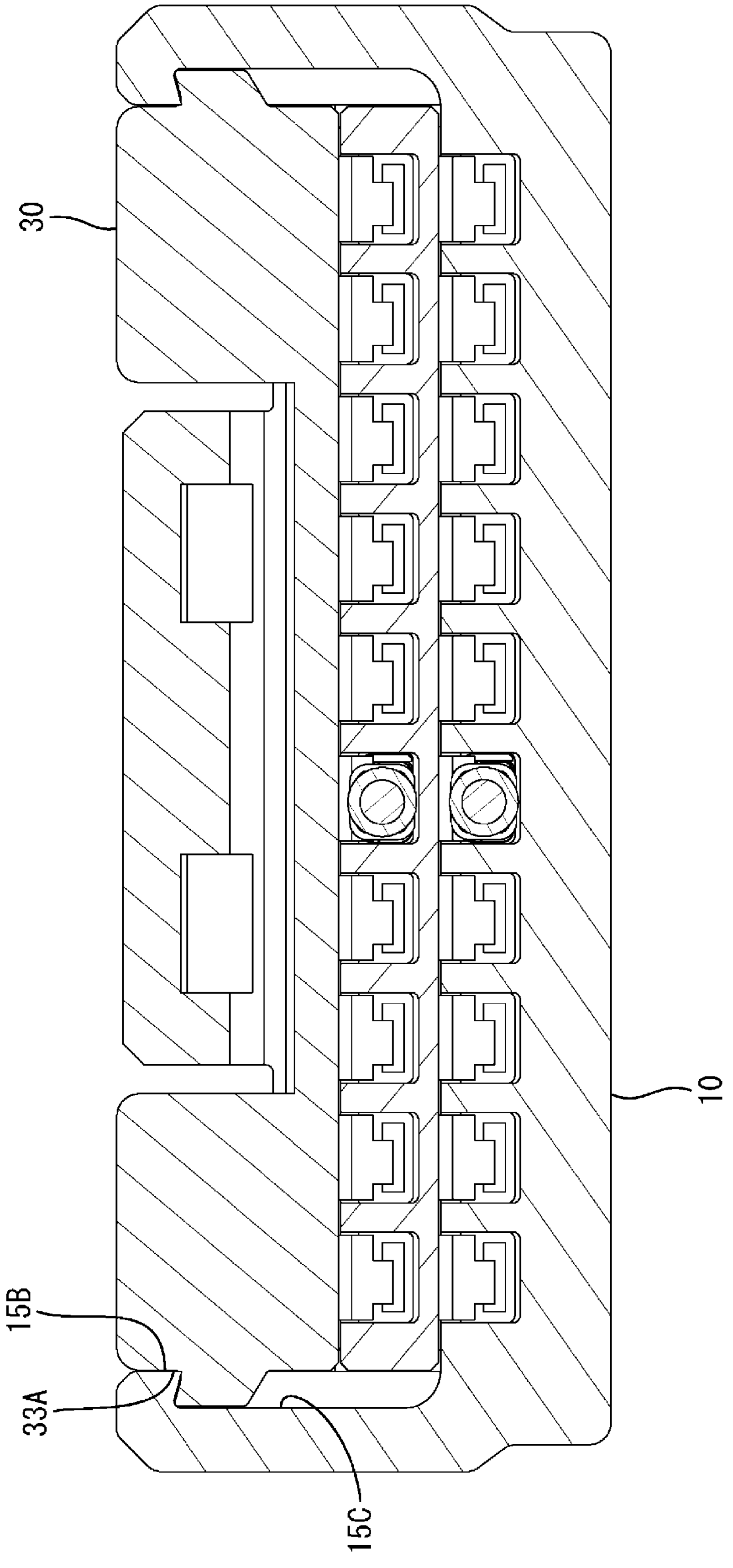
FIG. 10 is a section along C-C of FIG. 9.

One specific embodiment of a connector of the present disclosure is described with reference to FIGS. 1 to 11. In this embodiment, upper and lower sides shown in FIGS. 1 to 11 are directly defined as upper and lower sides concerning a vertical direction. Left and right sides shown in FIGS. 9 and 11 are directly defined as front and rear sides concerning a front-rear direction. Left and right sides shown in FIGS. 7, 8 and 10 are defined as right and left sides concerning a lateral direction.

(Configuration of Connector)

Figure 2:
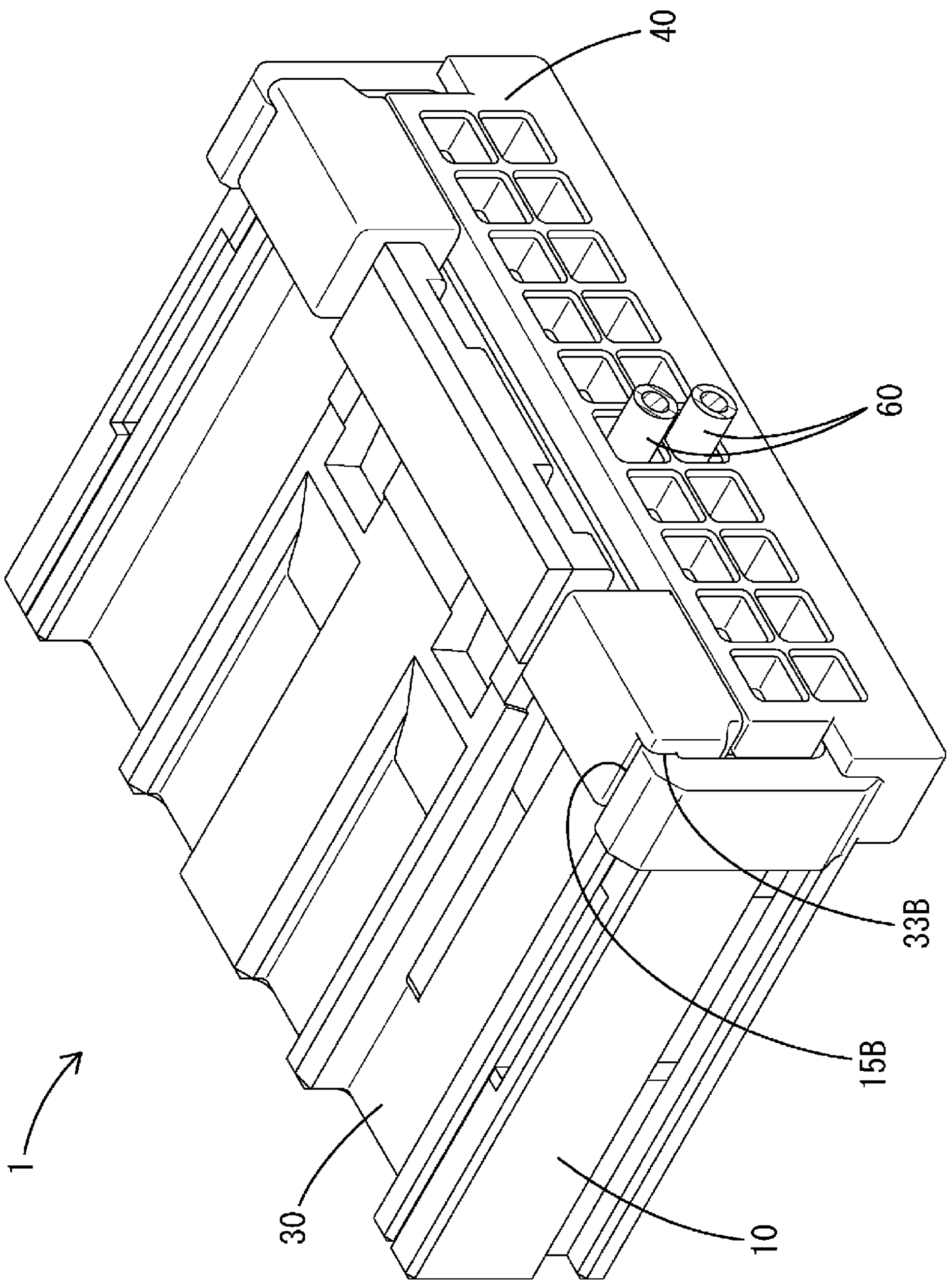
FIG. 2 is a perspective view of the connector when viewed from behind.

A connector 1 of this embodiment is provided with a first housing 10, a second housing 20, a third housing 30, a rear wall portion 40, terminal fittings 50 (see FIG. 9) and wires 60 as shown in FIGS. 1 and 2. The first, second and third housings 10, 20 and 30 correspond to "housings" of the present disclosure. The first, second and third housings 10, 20 and 30 are stacked on each other. The rear wall portion 40 constitutes a wall portion on a rear side of the connector 1. The terminal fittings 50 are accommodated in the first and second housings 10, 20. The wire 60 is fixed to the terminal fitting 50. The wire 60 is drawn out rearward from the first or second housing 10 or 20.

Each of the first, second and third housings 10, 20 and 30 is a single component made of synthetic resin. In the connector 1, the first, second and third housings 10, 20 and 30 are stacked in this order from below.

Figure 3:
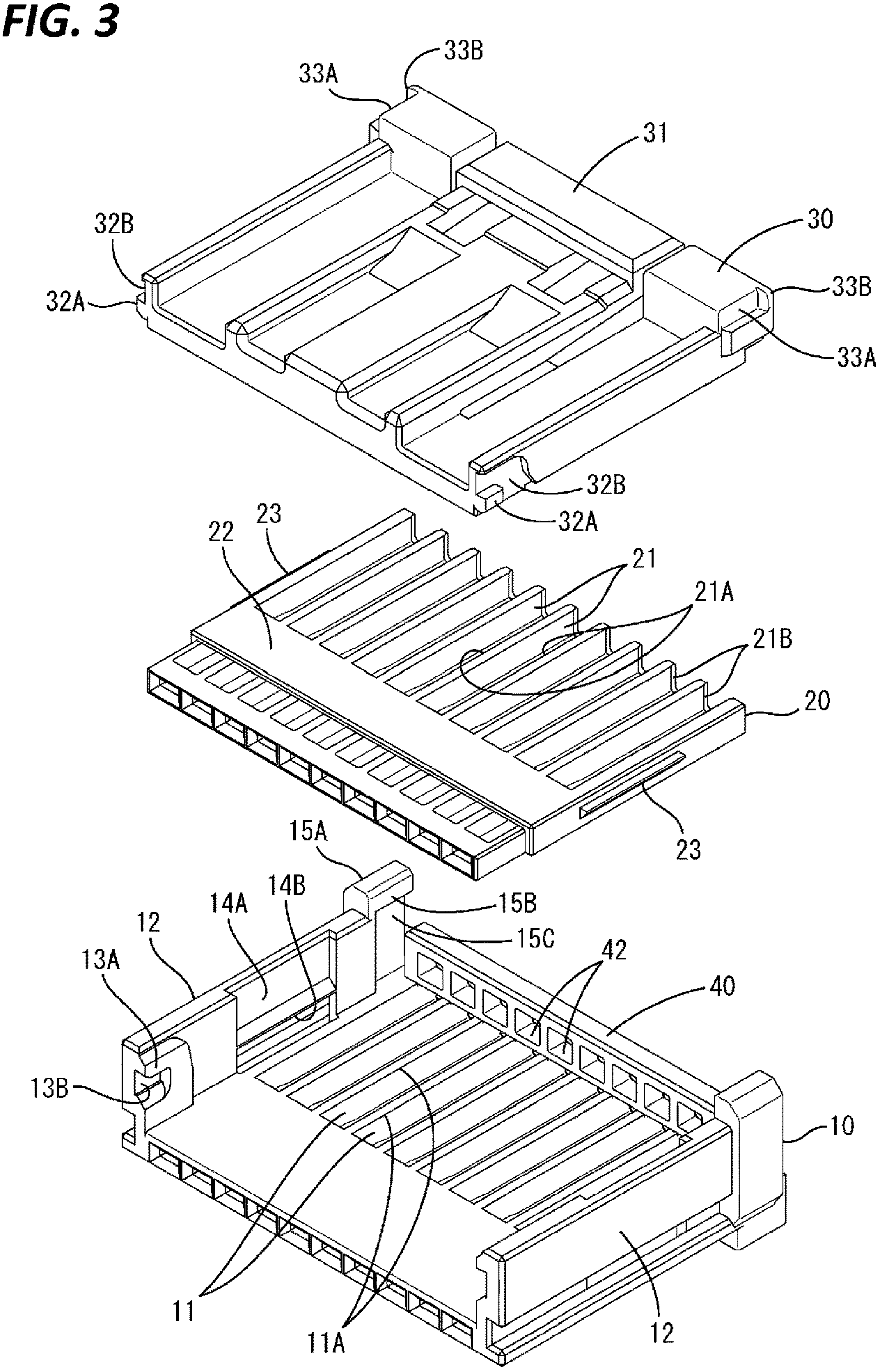
FIG. 3 is an exploded perspective view of the connector except terminal fittings when viewed from a front upper side.
Figure 4:
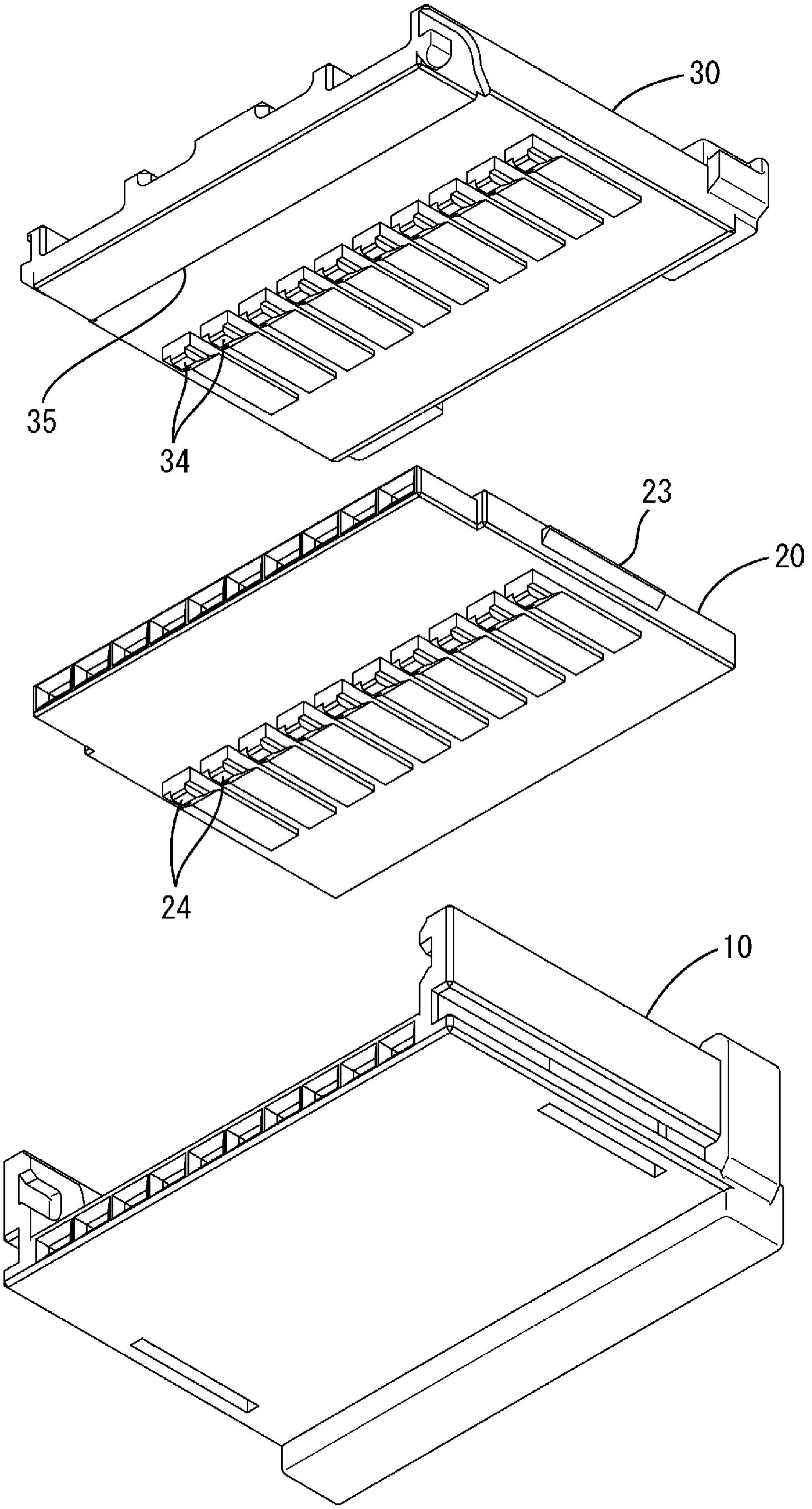
FIG. 4 is an exploded perspective view of the connector except the terminal fittings when viewed from a rear lower side.

As shown in FIGS. 3 and 4, the first housing 10 has a flat shape long in the lateral direction. The first housing 10 is provided with a plurality of first terminal accommodation chambers 11. The first terminal accommodation chamber 11 corresponds to an example of a "terminal accommodation chamber." The terminal fittings 50 are accommodated in the first terminal accommodation chambers 11. Note that a state where the terminal fittings 50 are accommodated only in some of the terminal accommodation chambers 11 is illustrated in FIGS. 6 to 8 and 10. The plurality of first terminal accommodation chambers 11 are arranged side by side in a row in a direction (lateral direction) intersecting a stacking direction. Note that the stacking direction means a stacking direction (vertical direction) of the first, second and third housings 10, 20 and 30. As shown in FIG. 3, the first terminal accommodation chamber 11 is long in the front-rear direction. An opening 11A open upward is provided on a rear end side of the first terminal accommodation chamber 11.

As shown in FIG. 3, the first housing 10 includes a pair of side walls 12. The side wall 12 is formed to be long in the front-rear direction from a front end side toward a rear end side of the first housing 10. A front bulging portion 13A bulging inward in the lateral direction (toward the other side wall 12) is provided on the front end of the side wall 12. A first recess 13B recessed outward in the lateral direction (toward a side opposite to the other side wall 12) is provided in the front bulging portion 13A. The first recess 13B is open forward.

As shown in FIG. 3, a recessed portion 14A recessed outward in the lateral direction is provided in a center in the front-rear direction of the side wall 12. The recessed portion 14A has a rectangular shape long in the front-rear direction when viewed from the lateral direction. A locked piece 14B projecting inward in the lateral direction is provided on a lower end side of the recessed portion 14A. The locked piece 14B and the recessed portion 14A have a shape elongated in the front-rear direction over an entire length.

As shown in FIG. 3, a rear bulging portion 15A bulging outward in the lateral direction and upward is provided on the rear end of the side wall 12. A first protrusion 15B and a second recess 15C are provided on a lateral inner side of the rear bulging portion 15A in the side wall 12. The first protrusion 15B projects inward in the lateral direction from the upper end of the rear bulging portion 15A. The second recess 15C is provided below and adjacent to the first protrusion 15B. The second recess 15C is recessed outward in the lateral direction.

The rear wall portion 40 is a single part made of synthetic resin. As shown in FIGS. 3 and 9, the rear wall portion 40 is integrally formed to the first housing 10. Here, the "single part" means a single part in a molded state. The "single part" does include a combination of a plurality of independent components. The first housing 10 and the rear wall portion 40 constitute one component. Thus, the number of members can be reduced as compared to the case where the rear wall portion 40 is a component separate from the respective housings 10, 20 and 30. The rear wall portion 40 rises upward from the rear end of the first housing 10. The rear wall portion 40 is a plate-like wall portion long in the lateral direction. The upper end of the rear wall portion 40 is located below those of the side walls 12. As shown in FIG. 7, a slit 41 is provided between the rear wall portion 40 and each of the pair of side walls 12. In this way, the side wall 12 is easily deflected and deformed in the lateral direction.

As shown in FIGS. 7 and 9, the rear wall portion 40 is provided with a plurality of through holes 42. The through holes 42 are not formed in components and parts other than the rear wall portion 40. The plurality of the through holes 42 are formed side by side in the lateral direction in two upper and lower stages. The through hole 42 has a square shape when viewed from the front-rear direction. The terminal fitting 50 and the wire 60 connected to the terminal fitting 50 are passed through the through hole 42. The through holes 42 are partitioned to individually communicate with the first terminal accommodation chambers 11 and second terminal accommodation chambers 21 to be described later. Since the through holes 42 individually communicate with a plurality of the terminal accommodation chambers (the plurality of the first terminal accommodation chambers 11 and a plurality of the second 21), the terminal fitting 50 is easily inserted into each terminal accommodation chamber 11, 21 when the wire 60 is passed through the through hole 42. Erroneous insertion of the terminal fitting 50 into each terminal accommodation chamber 11, 21 can also be prevented. Specifically, as shown in FIG. 9, the through hole 42 in the lower stage integrally communicates with the first terminal accommodation chamber 11 in the front-rear direction. As shown in FIG. 9, the through hole 42 in the upper stage communicates with the second terminal accommodation chamber 21 in the front-rear direction with the second housing 20 stacked on the first housing 10.

As shown in FIG. 9, the rear wall portion 40 is located behind the second housing 20 with the second housing 20 stacked on the first housing 10. Specifically, the rear wall portion 40 is in contact with the second housing 20 from behind. The rear wall portion 40 is located behind the third housing 30 with the first, second and third housings 10, 20 and 30 stacked on each other. Specifically, the rear wall portion 40 is in contact with the third housing 30 from behind. Since rearward displacements of the housings (second housing 20 and third housing 30) not formed with the rear wall portion 40 can be prevented in the above way, it is not necessary to provide a lock for restricting rearward displacements.

As shown in FIGS. 7 and 9, the rear wall portion 40 is formed with first separation restricting portions 43 and second separation restricting portions 44. The first and second separation restricting portions correspond to examples of a "separation restricting portion" of the present disclosure. The first and second separation restricting portions 43, 44 restrict the separation of the wires 60 arranged in the stacking direction of the first, second and third housings 10, 20 and 30 from the other wires 60 in an opposite direction along the stacking direction. The first separation restricting portion 43 is constituted by a lower wall portion of the through hole 42 in the lower stage. The first separation restricting portion 43 is constituted by the wall portion having a wall surface (wall surface facing upward) parallel to the front-rear direction and lateral direction. The second separation restricting portion 44 is constituted by an upper wall portion of the through hole 42 in the upper stage. The second separation restricting portion 44 is constituted by the wall portion having a wall surface (wall surface facing downward) parallel to the front-rear direction and lateral direction.

As shown in FIGS. 3 and 4, the second housing 20 has a flat shape long in the lateral direction. The second housing 20 is not formed with the rear wall portion 40. The second housing 20 is provided with the plurality of second terminal accommodation chambers 21. The second terminal accommodation chambers 21 correspond to examples of the "terminal accommodation chambers." The terminal fittings 50 are accommodated in the second terminal accommodation chambers 21. Note that FIGS. 6 to 8 and 10 illustrate a state where the terminal fittings 50 are accommodated only in some of the second terminal accommodation chambers 21. The plurality of second terminal accommodation chambers 21 are arranged side by side in a row in a direction (lateral direction) intersecting the stacking direction. As shown in FIG. 3, the second terminal accommodation chamber 21 is long in the front-rear direction. An opening 21A open upward is provided on a rear end side of the second terminal accommodation chamber 21. An upper wall portion 22 extending over the entire second housing 20 in the lateral direction is provided in front of the openings 21A. The upper wall portion 22 is higher than the front end of the second housing 20.

As shown in FIG. 9, a guiding portion 21B is formed on a rear end opening edge part of the second terminal accommodation chamber 21. The rear end opening edge part of the second terminal accommodation chamber 21 has a U shape open upward when viewed from behind. The guiding portion 21B is tapered toward a rear side. Specifically, the guiding portion 21B is inclined downward toward the rear side in a lower part of the rear end opening edge part of the second terminal accommodation chamber 21, and inclined outward in the lateral direction toward the rear side in both left and right side parts of the rear end opening edge part of the second terminal accommodation chamber 21. By this configuration, the terminal fitting 50 is guided forward by the tapered guiding portion 21B immediately after passing through the through hole 42 of the rear wall portion 40, wherefore the terminal fitting 40 can be prevented from being caught by the rear end opening edge part of the second terminal accommodation chamber 21.

As shown in FIGS. 3 and 8, locking pieces 23 are provided on both left and right ends of the second housing 20. The locking piece 23 projects laterally outward. The locking piece 23 is long in the front-rear direction. The locking piece 23 is provided behind the upper wall portion 22 in the second housing 20. As shown in FIG. 8, the locking pieces 23 are locked to the locked pieces 14B with the second housing 20 stacked on the first housing 10. Specifically, as shown in FIG. 8, the locking pieces 23 are located below the locked pieces 14B and in contact with the locked pieces 14B from below with the second housing 20 stacked on the first housing 10. In this way, the first and second housings 10, 20 are held in the stacked state by the locking pieces 23 and the locked pieces 14B. The locking pieces 23 and the locked pieces 14B correspond to examples of "locking portions" of the present disclosure. The locking pieces 23 are formed only on both end parts of the second housing 20 in the lateral direction (width direction intersecting a draw-out direction of the wires 60). Thus, the structure of the second housing 20 can be simplified. The locked pieces 14B are formed only on both end parts of the first housing 10 in the lateral direction. Thus, the structure of the first housing 10 can be simplified.

As shown in FIG. 4, a plurality of first hooking portions 24 are provided to correspond to the plurality of first terminal accommodation chambers 11 on the lower surface of the second housing 20. The first hooking portion 24 projects downward from the lower surface of the second housing 20. As shown in FIG. 9, the first hooking portion 24 enters the opening 11A of the first terminal accommodation chamber 11 from above and faces the front edge of the opening 11A and a projection 54 of the terminal fitting 50 to be described later. In this way, the terminal fitting 50 is prevented from coming out rearward and a forward movement of the second housing 20 with respect to the first housing 10 is restricted.

As shown in FIGS. 3 and 4, the third housing 30 has a flat shape long in the lateral direction. The third housing 30 is not formed with the rear wall portion 40. A cantilevered and deflectable lock arm 31 is provided in a central part in the lateral direction of the upper surface of the third housing 30. Second protrusions 32A projecting outward in the lateral direction are provided on corner parts of a front side of the third housing 30. Third recesses 32B recessed inward in the lateral direction are provided to surround the second protrusions 32A on both left and right side walls of the third housing 30. As shown in FIG. 6, the front bulging portions 13A are located in the third recesses 32B with the third housing 30 stacked on the second housing 20. The second protrusions 32A are fit in the first recesses 13B.

As shown in FIG. 3, fourth recesses 33A recessed inward in the lateral direction are provided on the rear ends of the both left and right side walls of the third housing 30. Third protrusions 33B projecting outward in the lateral direction are provided behind the fourth recesses 33A in the third housing 30. As shown in FIG. 10, the first protrusions 15B are located in the fourth recesses 33A with the third housing 30 stacked on the second housing 20. The first protrusions 15B are restricted from moving rearward by the third protrusions 33B located behind as shown in FIG. 2.

As shown in FIG. 4, a plurality of second hooking portions 34 are provided to correspond to the plurality of second terminal accommodation chambers 21 on the lower surface of the third housing 30. The second hooking portion 34 projects downward from the lower surface of the third housing 30. As shown in FIG. 9, the second hooking portion 34 enters the opening 21A of the second terminal accommodation chamber 21 from above and faces the front edge of the opening 21A (rear edge of the upper wall portion 22) and the projection 54 of the terminal fitting 50 to be described later. In this way, the terminal fitting 50 is prevented from coming out rearward and a forward movement of the third housing 30 with respect to the second housing 20 is restricted.

As shown in FIGS. 4 and 9, a step portion 35 lowered downward is provided in front of the plurality of second hooking portions 34 on the lower surface of the third housing 30. As shown in FIG. 9, the step portion 35 is in contact with the front end of the upper wall portion 22 from front. In this way, a rearward movement of the third housing 30 with respect to the second housing 20 is restricted.

Figure 5:
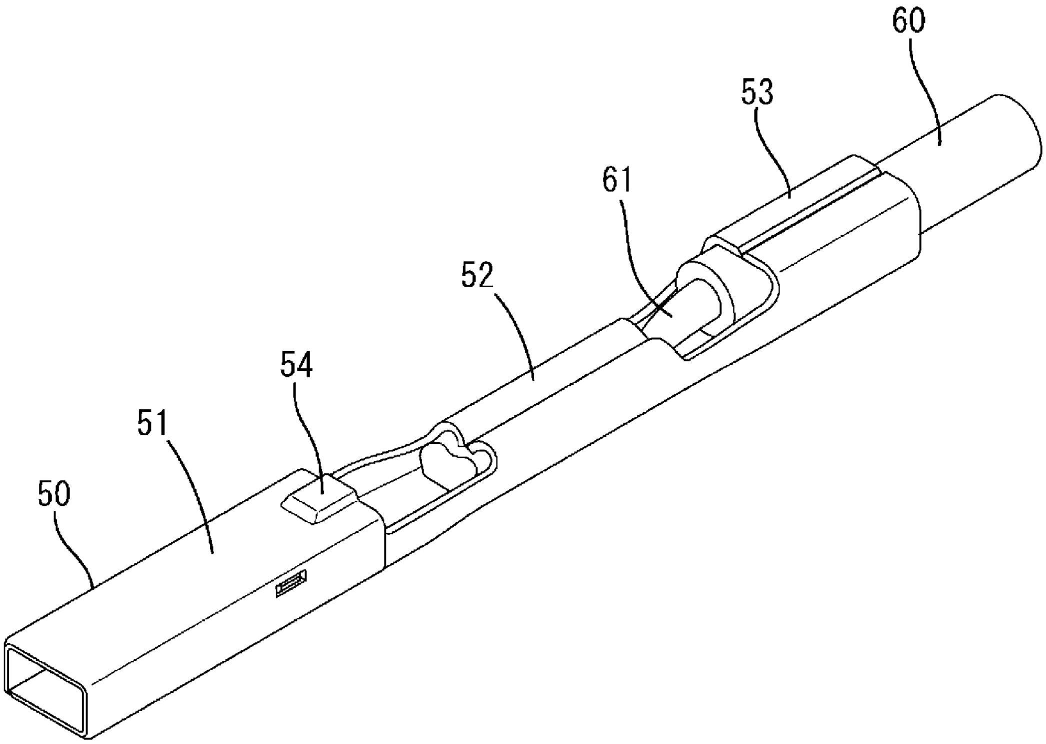
FIG. 5 is a perspective view of the terminal fitting.

As shown in FIG. 5, the terminal fitting 50 is, for example, a female terminal fitting. The terminal fitting 50 is formed by bending a metal plate material stamped into a predetermined shape. The terminal fitting 50 includes a rectangular tube portion 51, a first barrel 52 and a second barrel 53. The rectangular tube portion 51 has a tubular shape and accommodates a contact piece (not shown) to be brought into contact with a tab of a mating male terminal fitting (not shown). The projection 54 projecting upward is provided on the rear end of the upper surface of the rectangular tube portion 51. The first barrel 52 is crimped to a conductor wire 61 drawn out from the wire 60. The second barrel 53 is fixed to the wire 60 by being crimped.

(Housing Separation Suppressing Structure)

As described above, the rear wall portion 40 molded as the single part is formed with the first and second separation restricting portions 43, 44 as shown in FIG. 9. Thus, even if the wire 60 is pulled in a separation direction (direction opposite to the other wires 60), a pulling force applied to the wire 60 can be received by the rear wall portion 40. For example, if the lower wire 60 shown in FIG. 9 is pulled downward and the upper wire 60 shown in FIG. 9 is pulled upward, the lower wire 60 is received by the first separation restricting portion 43 and the upper wire 60 is received by the second separation restricting portion 44. By receiving pulling forces in different directions by the rear wall portion 40 molded as the single part in this way, the pulling forces applied to the wires 60 are less likely to be exerted to the respective housings 10, 20 and 30, and the separation of the respective housings 10, 20 and 30 in the stacked state can be suppressed.

(Connector Manufacturing Process)

Figure 11A:
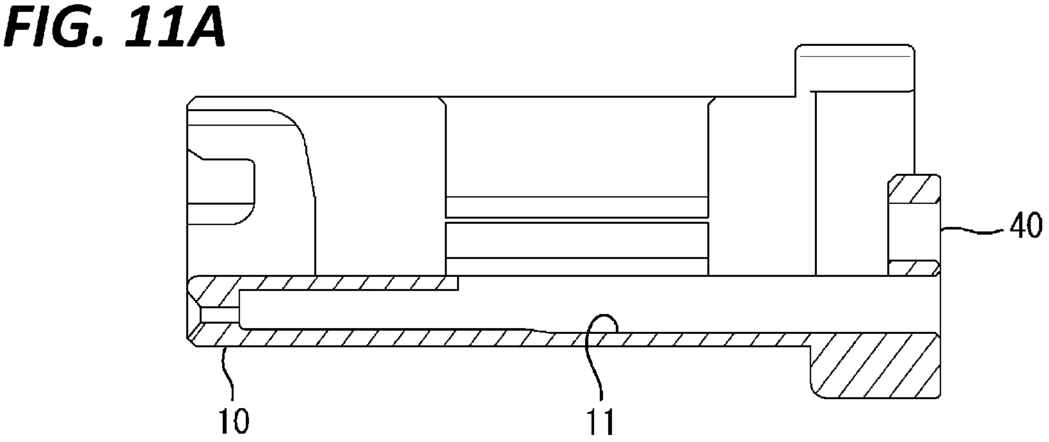
FIGS. 11A to 11D are views illustrating a manufacturing process of the connector.
Figure 11B:
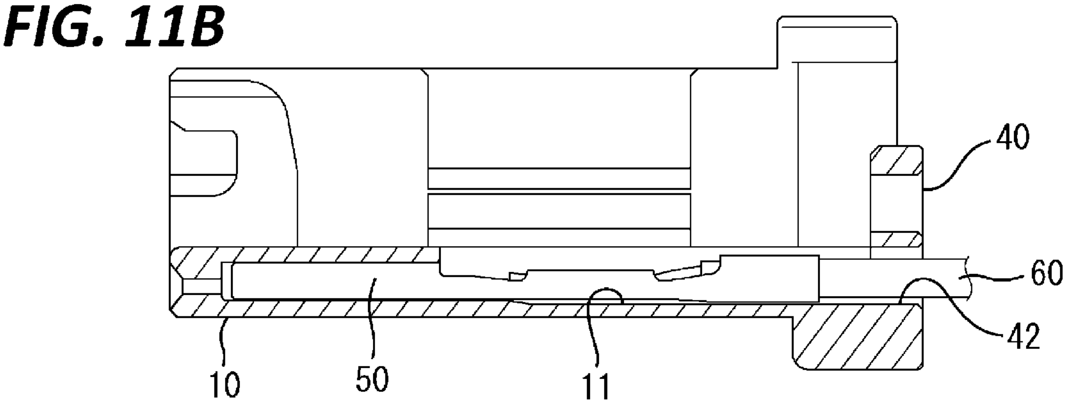

As shown in FIGS. 11A to 11D, the connector 1 is manufactured. First, as shown in FIG. 11A, the first housing 10 is prepared. Subsequently, as shown in FIG. 11B, the terminal fittings 50 connected to the wires 60 are inserted into the first terminal accommodation chambers 11 of the first housing 10 via the lower through holes 42 of the rear wall portion 40.

Figure 11C:
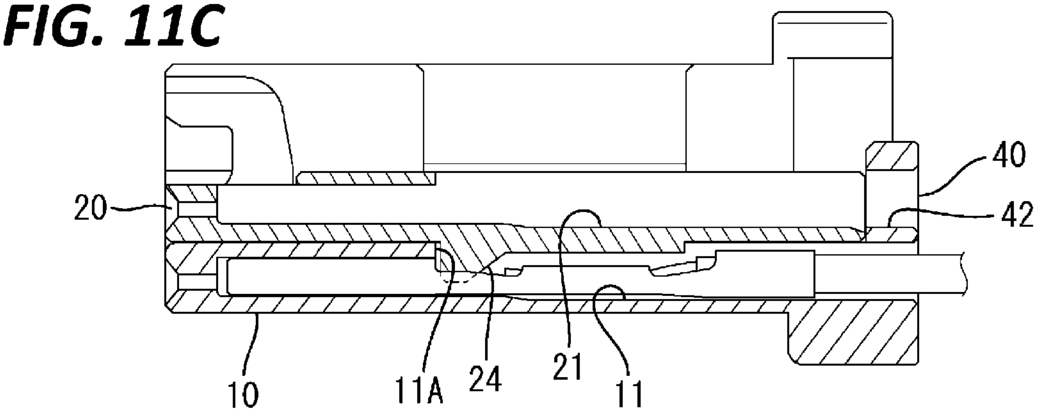

Subsequently, the second housing 20 is accommodated between the both side walls 12 of the first housing 10 and, as shown in FIG. 11C, the second housing 20 is stacked on the first housing 10. At this time, the locking pieces 23 of the second housing 20 are locked to the locked pieces 14B of the first housing 10. Specifically, the both side walls 12 are deflected and deformed outward in the lateral direction, whereby the locking pieces 23 ride over the locked pieces 14B and contact the locked pieces 14B from below as shown in FIG. 8.

As shown in FIG. 11C, the rear end of the second housing 20 contacts the front end of the rear wall portion 40. In this way, the through holes 42 of the rear wall portion 40 communicate with the second terminal accommodation chambers 21. The first hooking portions 24 of the second housing 20 are inserted into the openings 11A of the first terminal accommodation chambers 11 from above and caused to face the front edges of the openings 11A and the projections 54 of the terminal fittings 50 (see FIG. 9) from behind. In this way, the terminal fittings 50 are prevented from coming out rearward and a forward movement of the second housing 20 with respect to the first housing 10 is restricted.

Figure 11D:
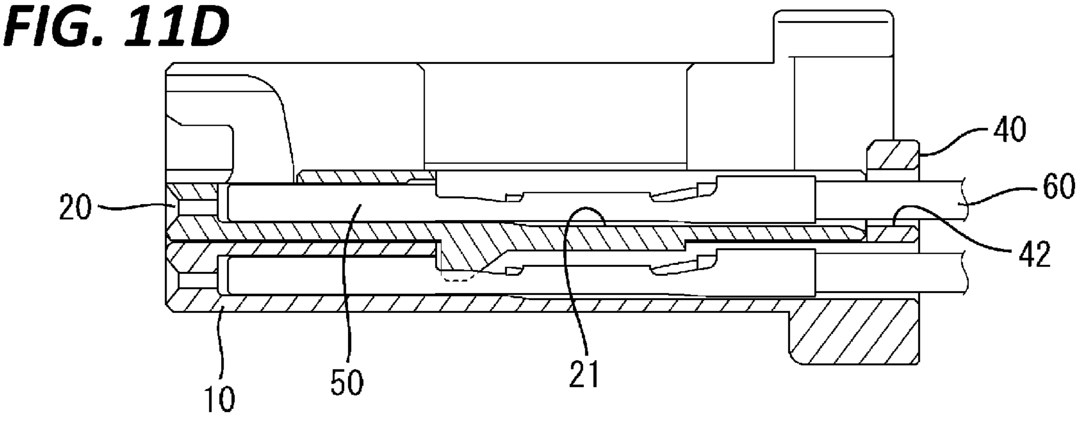

Subsequently, as shown in FIG. 11D, the terminal fittings 50 connected to the wires 60 are inserted into the second terminal accommodation chambers 21 of the second housing 20 via the upper through holes 42 of the rear wall portion 40.

Subsequently, the third housing 30 is accommodated between the both side walls 12 of the first housing 10 and, as shown in FIG. 9, the third housing 30 is stacked on the second housing 20. The rear end of the third housing 30 contacts the front end of the rear wall portion 40.

In stacking the third housing 30 on the second housing 20, the front bulging portions 13A are fit into the third recesses 32B as shown in FIG. 6. The second protrusions 32A are fit into the first recesses 13B. As shown in FIG. 10, the first protrusions 15B are fit into the fourth recesses 33A. As shown in FIG. 2, rearward movements of the first protrusions 15B are restricted by the third protrusions 33B located behind.

As shown in FIG. 9, the second hooking portions 34 of the third housing 30 are inserted into the openings 21A of the second terminal accommodation chambers 21 from above and caused to face the front edges of the openings 21A (rear edge of the upper wall portion 22) and the projections 54 of the terminal fittings 50 from behind. In this way, the terminal fittings 50 are prevented from coming out rearward and a forward movement of the third housing 30 with respect to the second housing 20 is restricted. The step portion 35 is brought into contact with the front end of the upper wall portion 22 from front. In this way, a rearward movement of the third housing 30 with respect to the second housing 20 is restricted.

Effects of Embodiment

As described above, according to the connector 1 of the present disclosure, the first and second separation restricting portions 43, 44 are formed in the rear wall portion 40 molded as the single part. Thus, even if the wire 60 is pulled in the separation direction (direction opposite to the other wires 60), a pulling force applied to the wire 60 can be received by the rear wall portion 40. Thus, the pulling force applied to the wire 60 is less likely to be exerted to the respective housings 10, 20 and 30 and the separation of the respective housings 10, 20 and 30 in the stacked state can be suppressed.

The through holes 42 of the rear wall portion 40 are partitioned to individually communicate with the plurality of first terminal accommodation chambers 11 and the plurality of second terminal accommodation chambers 21. According to this configuration, in passing the wires 60 through the through holes 42, the terminal fittings 50 are easily inserted into the first and second terminal accommodation chambers 11, 21. Erroneous insertion of the terminal fittings 50 into the first and second terminal accommodation chambers 11, 21 can also be prevented.

The rear wall portion 40 is integrally formed to the first housing 10. According to this configuration, the number of members can be reduced as compared to the case where the rear wall portion 40 is a component separate from the first housing 10.

The rear wall portion 40 is located behind the housings (second and third housings 20, 30) not formed with the rear wall portion 40. According to this configuration, since rearward displacements of the housings (second and third housings 20, 30) not formed with the rear wall portion 40 can be prevented, it is not necessary to provide a lock for restricting rearward displacements.

The tapered guiding portion 21B is formed on the rear end opening edge part of the second terminal accommodation chamber 21 of the second housing 20. According to this configuration, since the terminal fitting 50 is guided forward by the tapered guiding portion 21B immediately after passing through the through hole 42 of the rear wall portion 40, the terminal fitting 50 can be prevented from being caught by the rear end opening edge part of the second terminal accommodation chamber 21.

The locking pieces 23 are formed only on the both end parts of the second housing 20 in the lateral direction (width direction intersecting the draw-out direction of the wires 60). Thus, the structure of the second housing 20 can be simplified. The locked pieces 14B are formed only on both end parts of the first housing 10 in the lateral direction. Thus, the structure of the first housing 10 can be simplified.

Other Embodiments

The present invention is not limited to the above described and illustrated embodiment, but is represented by claims. The present invention is intended to include all changes in the scope of claims and in the meaning and scope of equivalents and include also the following embodiments.

Although the rear wall portion 40 is integrally formed to the first housing 10 in the above embodiment, a rear wall portion may be integrally formed to the other housing (second housing 20, third housing 30).

If the terminal accommodation chambers are provided in multiple stages as in the above embodiment, the rear wall portion 40 may include one through hole largely open to communicate with all the terminal accommodation chambers.

In the above embodiment, a through hole may be one slit communicating with all the terminal accommodation chambers formed in one housing.

Although the rear wall portion 40 is integrally formed to the first housing 10 in the above embodiment, a rear wall portion may be formed as a single component separate from the first housing 10. Here, the "single component" means a single component in a molded state. The "single component" does include a combination of a plurality of independent components.

Although the locking pieces 23 are formed only on the both end parts of the second housing 20 in the lateral direction in the above embodiment, a locking piece may be formed in a central part in the lateral direction. Similarly, although the locked pieces 14B are formed only on the both end parts of the first housing 10 in the lateral direction in the above embodiment, a locked piece may be formed in a central part in the lateral direction.

LIST OF REFERENCE NUMERALS

1 . . . connector
10 . . . first housing (housing)
11 . . . first terminal accommodation chamber (terminal accommodation chamber)
11A . . . opening
12 . . . side wall
13A . . . front bulging portion
13B . . . first recess
14A . . . recessed portion
14B . . . locked piece (locking portion)
15A . . . rear bulging portion
15B . . . first protrusion
15C . . . second recess
20 . . . second housing (housing)
21 . . . second terminal accommodation chamber (terminal accommodation chamber)
21A . . . opening
21B . . . guiding portion
22 . . . upper wall portion
23 . . . locking piece (locking portion)
24 . . . first hooking portion
30 . . . third housing (housing)
31 . . . lock arm
32A . . . second protrusion
32B . . . third recess
33A . . . fourth recess
33B . . . third protrusion
34 . . . second hooking portion
35 . . . step portion
40 . . . rear wall portion
41 . . . slit
42 . . . through hole
43 . . . first separation restricting portion (separation restricting portion)
44 . . . second separation restricting portion (separation restricting portion)
50 . . . terminal fitting
51 . . . rectangular tube portion
52 . . . first barrel
53 . . . second barrel
54 . . . projection
60 . . . wire
61 . . . conductor wire

What is claimed is:

1. A connector, comprising:

a plurality of housings, wherein the plurality of housings comprises a first housing, a second housing which is stacked on the first housing, and a third housing which is stacked on the second housing;

terminal fittings to be accommodated into at least one of the first and second housings, wires fixed to the terminal fittings, the wires being drawn out rearward from the at least one of the first and second housing, and a rear wall portion including through holes for allowing passage of the wires, wherein the rear wall portion is molded as a single component or single part, the rear wall portion is located behind the first and second housings and below at least a portion of the third housing, the rear wall portion is formed with a separation restricting portion for restricting separation of the wires arranged in a stacking direction of the housings from the other wires in an opposite direction along the stacking direction, and the rear wall portion is integrally formed to any one of the first and second housings.

2. The connector of claim 1, wherein:

the at least one of the first and second housings includes a plurality of terminal accommodation chambers arranged in a direction intersecting the stacking direction, the terminal fittings are accommodated into the terminal accommodation chambers, and the through holes are partitioned to individually communicate with the plurality of terminal accommodation chambers.

3. The connector of claim 1, wherein the rear wall portion is located behind the housing not formed with the rear wall portion.

4. The connector of claim 3, wherein:

the at least one of the first and second housings includes a plurality of terminal accommodation chambers arranged in a direction intersecting the stacking direction, and a tapered guiding portion is formed on a rear end opening edge part of the terminal accommodation chamber of the housing not formed with the rear wall portion.

5. The connector of claim 1, wherein:

the plurality of housings include locking portions for holding the plurality of housings in a stacked state, and the locking portions are formed only on both end parts of the housings in a width direction intersecting a draw-out direction of the wires.

6. The connector of claim 1, wherein:

the terminal fittings comprise a first set of terminal fittings to be accommodated into the first housing and a second set of terminal fittings to be accommodated into the second housing;

the through holes of the rear wall portion comprise a first set of through holes corresponding to the first set of terminal fittings and a second set of through holes corresponding to the second set of terminal fittings, the rear wall portion is integrally formed to the first housing but separate from the second housing.

7. The connector of claim 1, wherein:

the terminal fittings comprise a first set of terminal fittings to be accommodated into the first housing and a second set of terminal fittings to be accommodated into the second housing;

the through holes of the rear wall portion comprise a first set of through holes corresponding to the first set of terminal fittings and a second set of through holes corresponding to the second set of terminal fittings, the rear wall portion is integrally formed to the second housing but separate from the first housing.

8. The connector of claim 1, wherein:

a rear surface of the rear wall portion is on a substantially same level with a rear surface of the third housing.

* * * * *